United States Patent

Diener

[11] 3,861,636
[45] Jan. 21, 1975

[54] SELF-LOCKING FIXING MEMBER
[75] Inventor: Leslie J. Diener, Torrens Park, Australia
[73] Assignee: Omark Australia, Ltd., Clovelly Park, Australia
[22] Filed: Sept. 20, 1973
[21] Appl. No.: 399,056

[52] U.S. Cl. .................................. 248/343, 85/77
[51] Int. Cl.... B42f 13/00, E04g 17/18, F16b 13/06
[58] Field of Search ................... 85/77, 78, 86, 87; 248/343, 342, 58

[56] References Cited
UNITED STATES PATENTS
352,226  11/1886  Courtney ............................. 85/77
3,750,519  8/1973  Lerich ................................. 85/77

FOREIGN PATENTS OR APPLICATIONS
39,459   4/1957  Poland .................................. 85/77
670,886  9/1963  Canada .............................. 248/343
555,314  3/1957  Belgium ............................ 248/343
722,340  1/1955  Great Britain ....................... 85/77

Primary Examiner—Ramon S. Britts

[57] ABSTRACT

A shank having an expanded tapering portion at one end. An expansible ferrule encircles the shank adjacent the tapering portion. A resilient member anchored to the shank urges the expansible ferrule onto the tapering portion of the shank for expanding the ferrule into locking engagement with the wall of an aperture.

1 Claim, 8 Drawing Figures

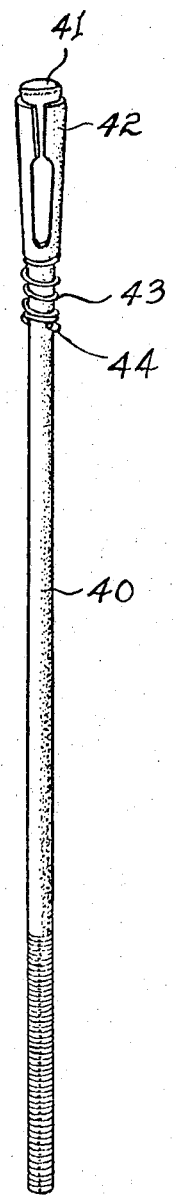
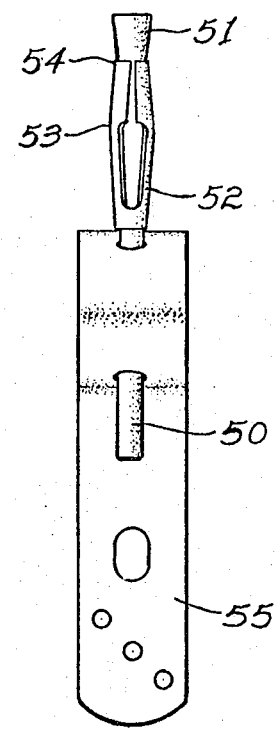
FIG.7
FIG.8

SELF-LOCKING FIXING MEMBER

HISTORY

This invention relates to a self-locking fixing member for fastening objects to concrete walls and the like.

Numerous devices have been proposed heretofore for providing a fixing member which can be inserted in a hole or aperture in a wall or any other support but the usual method of achieving a lock of such a member is to provide a form of screw device or the like which will expand a member in the aperture to provide the lock.

In this way it has been known to provide a threaded fixing member and to insert this into a tapered nut in a split member which is driven into a hole in a wall or the like and expansion of the split member is then effected by screwing up a fixing member bolt to cause the nut to expand the split member. This, of course, requires a reaction point to make the screwing effective because according to the devices known it is necessary firstly to hold the split member in the aperture while tightening the wedge mechanism and secondly to continue tightening or to retighten should the member require further expansion.

It was also known to provide a masonry anchor which typically consist of a stud having a threaded shank and a tapered head. A hole is bored in the concrete and the head is inserted therein. A split ferrule fits over the shank and a nut is screwed onto the shank to force the tapered head into the split ferrule. However, if the ferrule projects the nut cannot be drawn any closer to the concrete, and further turning merely draws the stud up through the tube, thus preventing the object being drawn down tightly to the concrete. To overcome this, a crushable collar was placed between the nut and ferrule which collar resisted crushing until the ferrule was firmly anchored. As further turning force is applied the collar is crushed to allow the nut to be drawn further into the shank.

Other known devices also exist where a member is inserted into an aperture or hole in a support where a simple screwing action of a member expands the member to lock it in position, but it will be realized that with existing assemblies there is no automatic take-up with changing conditions and the object of this invention is to achieve a self-locking or self-tightening assembly which does not require the screwing action on a crushable sleeve or an equivalent to maintain a firm hold.

According to the present invention, the attachment member comprises a shank which has an expanded inner tapered end, preferably with a curved taper, and over a portion of this shank is slidably positioned a split ferrule which is loaded into contact with the wall of an aperture into which it is exerted, preferably by axial loading toward the expanded end of the shank by a resilient member so that even when the assembly is pushed into an aperture, the ferrule will be urged into contact with the expanded end of the shank and while outward movement on the shank will cause expansion of the ferrule to lock the ferrule firmly in position, the pressure on the ferrule to tighten it in the aperture will be maintained under all normal conditions, or the ferrule can be radially urged into contact with the walls to allow it to be pushed in the aperture with axial restraint.

The ferrule has longitudinal slits which facilitate the necessary expanding action to effect a good grip in the aperture when the device is pushed into same, and the shaping is of course such that there is a relatively easy inward movement of the ferrule into the aperture but because it is restrained, outward movement is resisted because the ferrule is urged on to the tapered end of the shank by outward pull on the shank, even when fully positioned.

The taper on the end of the fixing member preferably as said of curved shaped which curves progressively outwardly from the axis of the shank to the end of the shank rather than of plain truncated conical form so that a progressive expanding action exists which exert a lesser expanding rate on the ferrule at the commencement of expansion but increases as the ferrule moves further on the taper to become more tightly locked.

This was found to greatly aid the tightening of the self-locking fixing member because the curvature can be selected to keep the expansion in correct proportion in relation to the outward force to ensure that the ferrule is expanded without axial movement of the ferrule in the aperture.

It will be realized that the self-locking fixing member according to the invention can be varied considerably in its construction but to enable its nature to be fully appreciated, embodiments will now be described but it is to be clear that the invention need not necessarily be limited to these, the embodiments being applied for instance where a ceiling is to be fitted to a concrete structure below which the ceiling is to be supported, or to fix a member to a support such as a wall, but may be used to support any other item or equipment or fix it in place.

FIGS. 6, 7 and 8 show further modified anchors.

Figure 2:
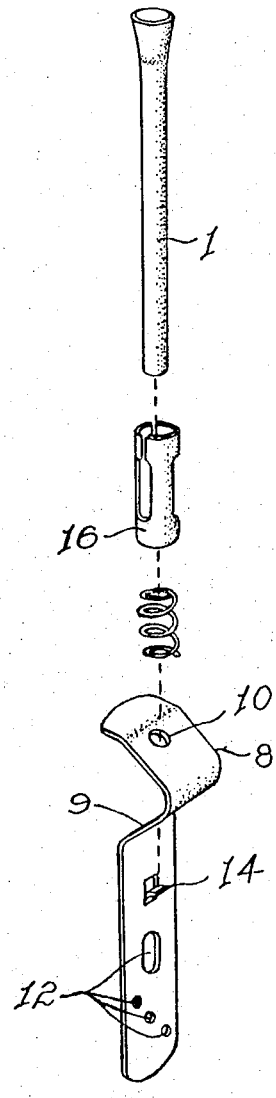
FIG. 2 is a perspective exploded view of same to illustrate the components.

Referring first to the form illustrated in FIGS. 1 to 4, a shank 1 has at its inner end an expanded portion 2 increasing to a larger diameter to form the wedge which expands a split ferrule 3 positioned over the shank 1.

The ferrule 3, which can be constructed of sheet metal or the like, cut and bent to form has its inner end 4 positioned against the tapered expanded portion 2 of the shank 1, the other end of the ferrule neatly surrounding the shank, but according to this invention the ferrule 3 is urged axially inward on the shank, that is into contact with the expanded portion 2, by means of a compression spring 5 which has its outer end confined on the shank 1 by any suitable means.

While a spring is shown in the embodiments it will be realized that any resilient member could be used, resilience being defined as "the stored energy of a strained material."

The means to confine the spring on the shank comprise a distortable spring clip 7 which is curved to have oppositely inclined portions 8 and 9 having apertures 10 and 11 formed therethrough, this assembly exerting a grip on the shank 1 by spring action when the shank is positioned through the apertures. To push the shank 1 through the apertures the strip 7, the two portions 8 and 9 are pressed toward each other to allow relatively free passage of the shank through the apertures 10 and 11, but on release the strip springs back and the strip locks on the shank in well-known manner.

The strip has apertures 12 to allow it to have ceiling fixing wires to be attached, or members could be nailed to the strip 7.

A lug 14 is shown to limit the distance the shank can be pushed through the apertures, but this is not essential.

Figure 1:
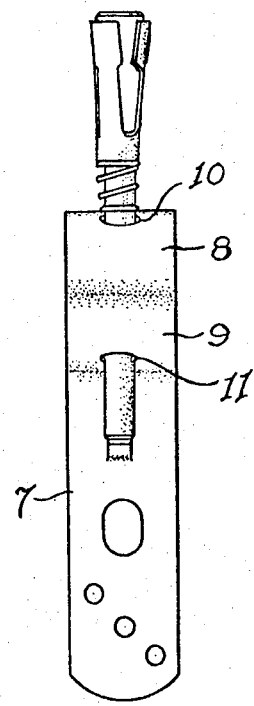
FIG. 1 is a front elevation of a ceiling anchor embodying the invention.

In considering particularly FIGS. 1 and 2, it will be seen that the shank 1 has the split ferrule 3 arranged to slide on the shank by engaging around it and the spring 5 is then confined between the outer end 16 of the ferrule and the strip 7 to urge the ferrule at all times against the expanded tapered portion 2 of the shank.

Figure 3:
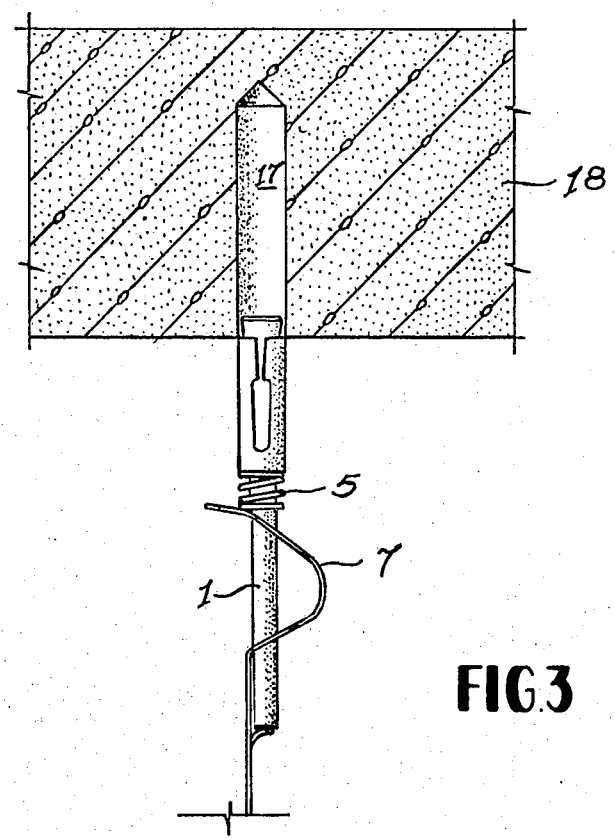
FIG. 3 shows the anchor about to be inserted into an aperture in a support member.
Figure 4:
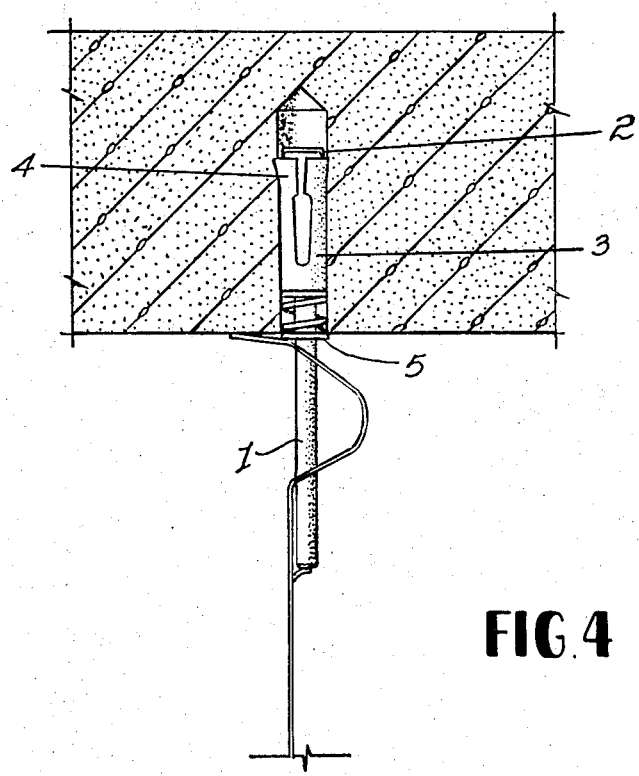
FIG. 4 shows the anchor inserted into the said aperture.

In this way the ferrule 3 is axially confined in both directions on the shank but may have some movement on the shank as the spring is compressed, and as shown in FIG. 3 as the device is inserted into an aperture 17 in a concrete ceiling 18 or wall or the like, the ferrule enters the aperture 17 and can move back on the shank until the pressure of the spring 5 forces it into the aperture, if necessary allowing the innermost edges of the ferrule to constrict around the smaller diameter of the tapered head portion of the shank, so that during positioning of the ferrule it is pushed forward by resting against the spring until it has been fully positioned in the aperture.

When the ferrule 3 has been fully inserted into the aperture, the wedging action caused by the spring continues, but as the inserting pressure on the shank is released, downward pressure exerted by the spring 5 on the shank, as well as pull on the shank, draws the tapered portion of the shank into the ferrule, causing the innermost edge to expand radially, thus causing a firm grip on the inside of the aperture in the concrete.

The spring 5 ensures that the ferrule continues to be urged inward by the spring and the ferrule cannot loosen to be pulled out of the aperture.

It will be realized that once the device is used to support a ceiling or the like, any further applied tension will increase the expansion and therefore the device will maintain its hold even if adjustment of the tension is required at a later stage such as if there should be a slight increase in the diameter of the aperture with time.

This advantage therefore results in a device which is not only self-fixing but will maintain its fixing so long as pressure to dislodge the member is applied, and even if no pressure is applied, the ferrule will remain wedged in position because of its inherent loading in the aperture due to the spring.

Figure 5:
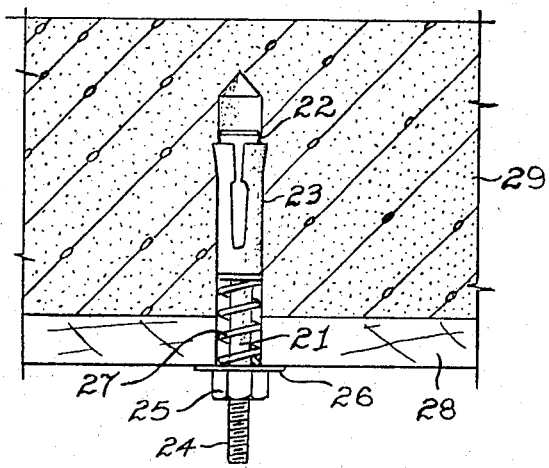
FIG. 5 shows a modified form of the device when used to bolt a member to a support.

In the embodiment shown in FIG. 5, the shank 21 has a tapered expanded end 22 engaging a ferrule 23, but in this case the shank has a threaded outer end 24 engaged by a nut 25, a washer 26 forming the reaction point for the outer end of the spring 27 while the inner end engages the ferrule 23 to ensure that it is constantly urged inwards. 28 represents a member held to a support 29 by the anchor.

Figure 6:
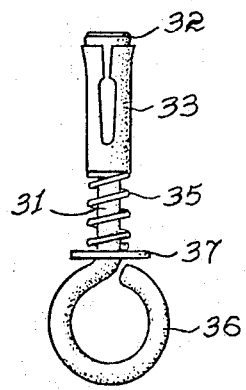

In the embodiment shown in FIG. 6, the shank 31 has a tapered expanded inner end 32 engaging a ferrule 33 and has an outer end, but in this case the spring 35 has its outer end confined by bending around the outer end of the shank to form an eye 36 on which a washer 37 rests.

In this case assembly of the unit is preferably carried out by placing the ferrule 33, spring 35 and washer 37 on the shank while it is straight and then forming the eye 36 by bending the shank.

In the embodiment shown in FIG. 7, the shank 40 is elongated and has a tapered expanded inner end 41 engaging a ferrule 42, a spring 43 being positioned on the shank 40 but confined between the ferrule 42 and punch marks 44 on the shank, the other end of the shank having a thread 45 on it.

In the embodiment shown in FIG. 8, the shank 50 has a tapered expanded inner end 51 which is engaged by the ferrule 52, but the ferrule is loaded radially intermediate its ends by curving the portions 53 outward so that the ferrule can be pushed into an aperture but has sufficient restraint to allow its inner end 54 to be expanded when the shank 50 is pulled outwardly. The ferrule is confined between the expanded inner end 51 and the spring clip 55. The spring clip 55 ensuring that the ferrule is forced into the aperture against the radially generated restraining force so that when outward pull on the spring clip, and thus the shank, occurs, the inner end of the ferrule will be expanded. The radially loaded ferrule can also be used in the earlier embodiments.

It will be realized that it is advantageous to so arrange the pressure exerted by the resilient member on the sleeve that, when the sleeve is not engaged in an aperture, it moves the sleeve a sufficient distance on to the expanded end to cause the sleeve to be forced back on the shank when it is pushed into the aperture, thereby to maintain contact of the end of the sleeve with the wall of the aperture as it is forced into the aperture, this being illustrated particularly in FIG. 3 of the drawings.

The claims defining the invention are as follows:

1. A self-locking fixing member and bracket combination adapted to be lockably inserted into an aperture in a receiving member, said self-locking fixing member and bracket combination comprised of assembled individual parts including; a shank having one end conically tapered and the remainder of the shank being straight, a single piece substantially cylindrical ferrule with one end split longitudinally to permit expanding, and the other end having a diameter smaller than the tapered end and larger than the straight end of the shank, said ferrule slipped over the straight end of the shank and being positioned on the shank with the split end thereof abutting the tapered end of the shank, a coil spring slipped over the straight end of the shank and having one end in abutment with the ferrule opposite the split end, and a distortable one-piece spring strip having two apertured portions being contiguous with each other and being oppositely inclined with respect to each forming a lockable clip distorted to align the apertures whereby it is slipped onto the straight end of the shank, said strip being positioned on the shank in abutment with the other end of the coil spring to anchor the coil spring which urges the split end of the ferrule onto the tapered end of the shank, and said spring strip being extended longitudinally beyond the shank opposite the tapered end and including means for engaging and supporting a component such as a suspended ceiling or the like to be interconnected to the receiving member.

* * * * *